United States Patent [19]

Vaughan et al.

[11] Patent Number: 5,338,526

[45] Date of Patent: * Aug. 16, 1994

[54] DIVALENT TRANSITION-METAL-ALUMINOSILICATE HYDROCARBON CONVERSION CATALYSTS HAVING MAZZITE-LIKE STRUCTURES, ECR-23-D

[75] Inventors: David E. W. Vaughan, Flemington; Karl G. Strohmaier, Port Murray, both of N.J.

[73] Assignee: Exxon Research and Engineering Company, Florham Park, N.J.

[*] Notice: The portion of the term of this patent subsequent to Feb. 9, 2010 has been disclaimed.

[21] Appl. No.: 11,914

[22] Filed: Feb. 1, 1993

Related U.S. Application Data

[63] Continuation-in-part of Ser. No. 746,264, Aug. 15, 1991, Pat. No. 5,185,137, which is a continuation of Ser. No. 554,628, Jul. 18, 1990, abandoned, which is a continuation-in-part of Ser. No. 283,037, Dec. 5, 1988, abandoned, which is a continuation of Ser. No. 14,203, Feb. 4, 1987, abandoned, which is a continuation of Ser. No. 763,652, Aug. 8, 1985, abandoned.

[51] Int. Cl.$^5$ .............. C01B 33/26; B01J 29/06
[52] U.S. Cl. .................. 423/328.2; 423/709; 502/64; 502/74
[58] Field of Search .............. 423/702, 709; 502/64, 502/74, 77

[56] References Cited

U.S. PATENT DOCUMENTS

| | | | |
|---|---|---|---|
| 5,173,281 | 12/1992 | Chang et al. | 423/702 |
| 5,185,136 | 2/1993 | Vaughan et al. | 502/74 |
| 5,185,137 | 2/1993 | Vaughan et al. | 423/709 |
| 5,185,138 | 2/1993 | Vaughan et al. | 502/60 |

Primary Examiner—Anthony McFarlane
Attorney, Agent, or Firm—Ronald D. Hantman

[57] ABSTRACT

This invention relates to novel zeolitic compositions having one or more transition metals as well as aluminum and silicon in the framework tetrahedral positions. The composition has a mazzite-like structure. The invention also involves a process of preparation in which at least one divalent transition metal is directly synthesized into the product.

21 Claims, 4 Drawing Sheets

DIVALENT TRANSITION-METAL-ALUMINOSILICATE HYDROCARBON CONVERSION CATALYSTS HAVING MAZZITE-LIKE STRUCTURES, ECR-23-D

CROSS REFERENCES TO RELATED APPLICATIONS

This is a continuation-in-part of U.S. Ser. No. 746,264 (now U.S. Pat. No. 5,185,137) filed Aug. 15, 1991, which was a Rule 60 continuation of U.S. Ser. No. 554,628 filed Jul. 18, 1990 (now abandoned), which was a continuation-in-part of U.S. Ser. No. 283,037 filed Dec. 5, 1988 (now abandoned), which was a Rule 60 continuation of U.S. Ser. No. 014,203 filed Feb. 4, 1987 (now abandoned), which was a Rule 62 continuation of U.S. Ser. No. 763,652 filed Aug. 8, 1985 (now abandoned).

FIELD OF THE INVENTION

This invention relates to novel zeolitic catalyst compositions having one or more transition metals as well as aluminum and silicon in the framework tetrahedral positions. The composition has a mazzite-like structure. The invention involves a process of preparation in which at least one divalent transition metal is directly synthesized into the product, and the product is ion exchanged and fabricated into a catalyst suitable for such petroleum and petrochemical conversion reactions as reforming, isomerization and hydrocracking, particularly of sulfur containing feedstocks.

BACKGROUND OF THE INVENTION

Zeolites, although generally viewed as having broad compositional substitution possibilities (Pure and Appl. Chem. (1979), 51, p. 1091), are usually defined as crystalline hydrated aluminosilicates of Group I and Group II elements. In particular, those elements include sodium, potassium, calcium, magnesium, barium and strontium. The structure of zeolites is typically an aluminosilicate framework based on an indefinitely extending three dimensional network of $AlO_4$ and $SiO_4$ tetrahedra linked to each other by sharing of the corner oxygens. Zeolites are often represented by the empirical formula $M_{2/n}O \bullet Al_2O_3 \bullet$ x $SiO_2 \bullet$ y $H_2O$. In this oxide formula, x is generally greater or equal to 2 since $AlO_4$ tetrahedra are joined only to $SiO_4$ tetrahedra, and n is the Group I or Group II cation valence. The framework contains channels and interconnected voids which may be occupied by the cation and by water molecules. The cations are often quite mobile and may be exchanged by other cations. Intracrystalline zeolitic water may be reversibly removed. In some zeolites, cation exchange or dehydration may produce structural changes in the framework.

Much zeolite research has focused on the synthesis of zeolite frameworks containing elements other than silicon and aluminum. It is known that gallium ions and germanium ions may be substituted for aluminum and silicon cations in the framework. While an extensive family of aluminum-phosphorus zeolites (AlPO's) has recently been synthesized, the substitution of other elements is the subject of major controversy in the zeolite literature. For instance, U.S. Pat. Nos. 3,329,480 and 3,329,481 both issued to D. A. Young, report the existence of crystalline zirconosilicate and titanosilicate zeolites. A zeolite having chromium in the tetrahedral positions has been described by Yermolenko et al at the Second Oil Union Conference on Zeolites, Leningrad, 1964, pages 171-8 (published 1965). However, D. W. Breck, in Zeolite Molecular Sieves, p. 322, John Wiley & Sons (1974) suggests that the chromium present was not present in a zeolite A structure and furthermore was present as an impurity in insoluble form. The impurity was said to be in the form of a chromium silicate as confirmed by the nature of the water vapor adsoption isotherm. This subject has been reviewed by Barter, "Hydrothermal Chemistry of Zeolites", Academic Press (1982), p. 294.

Because of the presence of phosphorus in tetrahedral $PO_4$ units in certain rare zeolites, extensive work has been done to synthesize zeolites containing $PO_4$ tetrahedral. Various phosphorus containing zeolites have been prepared and reported in Breck, supra, p. 323 et seq. The synthesis technique for production of phosphorus-containing zeolites generally involves crystallization from a gel in which the phosphorus is first incorporated by a controlled copolymerization and coprecipitation of all of the component oxides in the framework, i.e., aluminate, silicate, and phosphate in the homogeneous gel phase. The crystallization of the gel is then carried out at a temperature between 80° C. and 210° C.

The synthesis of major iron-containing zeolitic structures has been reported. Japanese Kokai 59,121,115, published Jul. 13, 1984, disclosed an aluminosilicate having a faujasite structure and containing coordinated iron. The chemical composition is said to be of the formula $aM_{2/n}O \bullet b\ Fe_2O_3 \bullet Al_2O_3\ cSiO_2$ where M can be H, alkali metal or alkaline earth metal. The symbol n is the valence of M; $a=1\pm0.3$; c is between 4.6 and 100; and a is less than b and both are less than 7. The relation between the IR absorption wave number (y) in $cm^{-1}$ and the crystal lattice parameter $a_o$ is said to be expressed as $Y \leq -116.7a_o + 3920$.

Similarly, U.S. Pat. No. 4,208,305 (Eur. Pat. No. 115,031●A) discloses a crystalline ferrosilicate having the general formula:

$$aM_{2/n}O\bullet(Al_xFe_{1-x})_zO_3\bullet bSiO_z$$

where M is a cation of valence n, a=0–2.0, b=3–100 and z=0–0.98. The composition is said to have a uniform pore diameter of 4–5Å and a characteristic x-ray powder diffraction pattern of:

| 2Θ | d(Å) | Rel. Intensity |
|---|---|---|
| 10.9–11.1 | 8.12–7.97 | M–VS |
| 13.4–13.5 | 6.61–6.56 | M–S |
| 17.4–17.5 | 5.10–5.07 | M–S |
| 21.0–21.1 | 4.23–4.21 | M–S |
| 22.0–22.1 | 4.40–4.02 | M–VS |
| 20.6 | 3.121 | M–S |
| 32.3–32.4 | 2.772–2.763 | M–S |

The composition is formed by maintaining a mixture having a molar oxide composition of: 0–10 $R_2O$:1–15 $M_{2/n}$:$(Al_xFe_{1-x})_2O_3$: 10–200 $SiO_2$:200–1000 $H_2O$ where R is an organic templating agent.

A range of metallo-alumino-phosphates and metallo-silico-alumino-phosphates compositions have recently been reviewed (Flanigen et al, in "Innovations in Zeolite Materials Science", Ed. Grobet et al, SSSC v. 37, p. 13 (Elsevier)). The structure and composition of the present invention has not been reported in such families of materials.

None of this literature discloses a transition-metal-alumino-silicate composition having a mazzite-like structure and having the chemical composition disclosed herein, and its use as a hydrocarbon conversion catalyst.

SUMMARY OF THE INVENTION

This invention deals with a transition-metal-aluminosilicate catalyst composition having a mazzite-like structure.

The transition metal may be present in the framework, cation and interstitial sites of the zeolitic structure. The generalized synthesized chemical composition is:

$xR_2O; (a-x)Na_2O:yDO:Al_2O_3:3$ to $20$ $SiO_2:0$ to $10$ $H_2O$ where $0.10 < y > 2.50$, $a = 1$ to $1.5$, $x = 0.01$ to $0.67$, and D is at least one divalent transition metal, preferably Ni or Co or mixtures thereof and with Zn.

R may comprise salts or hydroxides of tetramethylammonium, bis-dihydroxyethyl-dimethylammonium, triethylenediamine, 1,4 diazobicyclo (2,2,2) octane (DABCO), pyrrolidine or choline, or mixtures of same.

In addition, gallium may be substituted for aluminum and germanium may be introduced for silicon. $Na_2O$ may be replaced, to a limited extent, by $Li_2O$ and $K_2O$ without major development of impurity phases. The possible formation of organic molecule clathrates (either neutral molecule or organic salt) will alter the apparent cation balance within the structure.

In addition, gallium and germanium may be substituted for aluminum and silicon respectively. Typically the divalent transition metal is distributed between the framework (T) sites and cation sites, but may also be in interstitial channel sites. Such distribution, introduced during the zeolite synthesis, gives these materials properties different from either the zeolite without transition metal in the synthesis or materials post exchanged with the transition metal. Work on ALPO and MeAPO zeolitic structures (reviewed by Flanigen et al, Proc. 7the Intl. Zeolite Conf., p. 103 (1986), Kodansha/Elsevier (Tokyo)) shows that in the hydrated state not only do the transition metals partition between framework and cation sites and may show multiple coordination when occupying framework positions (Thomas et al, Chem. Mater., v. 3, p. 667 (1991); Kraushaar-Czarnetzki et al, J. Chem. Soc. Faraday, V. 87, p. 891 (1991); Olender et al, J. Amer. Chem. Soc., v. 115 (1993)), but Al and P do so too (Blackwell and Patton, J. Phys. Chem., v. 92, p. 3965 (1988)). As a function of temperature, such partly hydroxylated transition metals loose hydroxyl groups and anneal into the tetrahedral frameworks. The same process seems to occur with ECR-23D with a portion of the divalent transition metal component (D), in which case the previous formulation can be recalculated to an equivalent partitioned zeolite stoichiometry, with framework and non-framework components, approximating:

$1.0$ to $1.5(K_2O, R_2O)$ $aDO: ((1-b)Al_2O_3: bDO): 3$ to $20$ $SiO_2; 1$ to $10$ $H_2O$ where $a/(a+b)$ is the fraction of divalent transition metal in non-framework sites and $b/(a+b)$ the fraction of DO in framework sites, the latter is between 0.02 and 0.50. The process for synthesizing the inventive transition metal aluminosilicate hydrocarbon conversion catalyst involves the direct introduction of a divalent transition metal salt containing, Ni, Co or Zn, or mixtures of the same, into the zeolite synthesis reaction gel.

The process for synthesizing the inventive transition-metal-aluminosilicate catalyst involves direct introduction of at least one divalent transition-metal into the structure as the material is crystallized.

Experiments with these materials reacted with $H_2S$ at high temperatures show that the transition metal in the framework may also react to form the metal sulfide, but that such framework depletion of T atoms does not cause the framework to collapse in the cases of single channel restricted pore systems. This unique reactivity towards $H_2S$ allows these transition metal substituted materials to act as sulfur absorbers, or sinks and scavengers, under reaction conditions and therefore to protect the noble metal catalyst (usually Pt or Pd) from deactivation due to sulfur containing feedstocks in catalytic applications. We have discovered that such transition metal framework substituted zeolites seem to be "protected" catalysts as they do not show the deterioration in catalytic activity expected from catalysts containing such high transition metal contents, and may have significant selectivity advantages in some operations. In most hydrocracking, reforming and isomerization systems hydrogen is recycled after removal of most contaminants, such as sulfur compounds, in an external purification system (usually a fixed bed cyclic absorbent process). Sulfur leakage in these systems is the major contaminant which poisons the active catalyst promoters. The transition metal framework substituted zeolites of this invention clearly offer the advantages of acting as a polishing sulfur trap in the catalyst itself, providing additional sulfur protection in case of process upsets, inadequate pretreatment or feed contamination. They would seem to offer unique advantages in the instances where the noble metal is particularly sensitive to poisoning, as in the case, for example, of aromatization of paraffinic feedstocks reported by Hughes and co-workers (Proc. 7th International Zeolite Conf., Ed. Murakami et al, p. 725 (1986) Kodansha/Elsevier (Tokyo)).

DESCRIPTION OF THE PREFERRED EMBODIMENTS

The invention herein is, in general terms, a transition metal aluminosilicate hydrocarbon catalyst composition having the transition metal present in the framework, cation and interstitial sites of the zeolite structure. A more desirable composition of matter has a chemical makeup in the range:

XR$_2$O: (a−x)Na$_2$O:yDO:Al$_2$O$_3$:3 to 20 SiO$_2$:0 to 10 H$_2$O where 0.10<y>2 50, a=1 to 1.5, x=0.01 to 0.67 and D is at least one divalent transition metal, preferably Ni or Co, or mixtures thereof and with Zn.

An even more preferable transition metal aluminosilicate is the composition with:

0.20<y>1.50.

In addition gallium, germanium and iron may be substituted for aluminum and silicon respectively.

R is a tetramethylammonium, bishydroxyethyl-dimethylammonium, triethylene diamine, 1,4 diazobicyclo (2,2,2) octane, pyrrolidine, choline, or mixtures of same.

The added divalent transition metal creates a tendency for the metal to partition between the framework and non-framework positions, presumably to offset the higher framework negative charge with divalent cations in a restricted number of sites.

Each of these compositions is quite similar in structure to the mazzite-like zeolite structure but has some transition-metal ions in tetrahedral framework positions in place of Al$^{3+}$ and Si$^{4+}$. As will be discussed below, the structure of this transition-metal alumino-silicate, ECR-23-D, has two distinctly different tetrahedral positions. Given the size and electronic differences between the transition metal and Si and Al, the transition-metal ions might be expected to prefer one position over the other.

Mazzite-type materials are considered to include the mineral itself as well as its aluminosilicate isostructure ZSM-4 (British Patent 1,117,568) and zeolite omega (British Patent 1,178,186). ECR-15 (U.S. Pat. No. 5,000,932) is a particularly desirable form of mazzite as the template is mainly located in the 12-ring channel and removable below about 400° C. Although there are theoretical proposals for the structure of zeolite omega (Barter and Villiger, Chem. Soc. Chem. Comm. (1969), p. 659), the later discovery of the mineral mazzite and the solution of its structure (Galli, Cryst. Struct. Comm. (1974), 3, p. 339) led to the conclusion that mazzite, omega and ZSM-4 are isostructural aluminosilicate zeolites (Meier and Olson, "Atlas of Zeolite Structure Types", International Zeol. Assoc. Structure Comm. (1978)). Differentiation of mazzite and the theoretical omega structure is difficult, and although the products of this invention are presumed to be similar to mazzite, they may also embrace the theoretical omega structure on the basis of available data. ECR-23-D may be one or the other, or quite possibly, mixtures of intergrowths of both structural types, but containing Zn$^{2+}$, Cr$^{3+}$, Ni$^{2+}$ and/or Co$^{2+}$ in tetrahedral framework positions in addition to A$^{3+}$, Si$^{4+}$, Ga$^{3+}$ or Ge+4.

The structure has a large open channel and, in various ion exchanged forms may be expected to have important catalytic applications in such areas as cracking, isomerization, dewaxing, reforming, polymerization and Fischer-Tropsch synthesis chemistry. Prior art aluminosilicates of this type have been successfully evaluated in many such applications (e.g., British Patents 1,210,335 and 1,211,973; U.S. Pat. No. 3,914,331; 3,923,639, and 4,021,447). Iron impregnated and/or exchanged forms of ECR-23-D should be particularly useful catalysts for hydrocarbon synthesis from CO and H$_2$ mixtures because of the possibility of interactions between framework transition metal oxyhydroxide species resulting from demetallation of the lattice, and the impregnated or exchanged species.

Furthermore, it is anticipated that the transition-metal aluminosilicate catalyst, ECR-23-D, may provide the basis of various processed for forming high silica zeolites in that divalent transition metals may be easier to remove by acid leaching of the framework by virtue of the higher solubility of their ions in acidic solutions and a lower tendency to form polymeric species at acid pH. Similarly, hydrothermal treatment of these metallo-aluminosilicates should preferentially hydrolyze the framework transition metal, making it more readily removable, and thus enhancing the silica content of the framework in an ordered manner.

The metallo-aluminosilicate catalysts of this invention may be prepared by forming a reaction mixture comprising an alumina source, a silica source, a divalent transition metal source, a sodium oxide source, an organic template, and an optionally source of nucleating seeds.

The sodium oxide source may be its silicates or its hydroxides. The silica may be derived from a wide variety of sources. For instance, the source may be a silica gel, silica acid, aqueous colloidal silica sols, fume silicas and chemically precipitated silica sols. The sodium and silica may be derived from a single source such as sodium silicate.

The alumina source may be sodium aluminate, metakaolin, alumina, hydrated alumina, aluminum alkoxides or the like.

The transition metal source may be any divalent transition-metal-containing soluble salt preferably of a strong acid, e.g., nitrates, chlorides, sulfates, etc.

The templating agent may be a hydroxide or salt of tetra-methylammonium, bis-dihydroxy ethyl-dimethylammonium, triethylene diamine, 1,4 diazabicyclo (2,2,2) octane, pyrrolidine, or choline.

The use of a seeding mixture is preferred. The seeds may be microcrystalline mazzite-like products, ECR-23-D, or nucleation slurried of the types described in U.S. Pat. Nos. 3,433,589; 3,574,538; and 4,178,353. Seeding is effective when used at a level equivalent to 0.1 and 10% based on the weight of the product. Cold aging may also initiate nucleation in place of the added seeds, but this method is slower than seeding. A particularly effective seeding method is described in U.S. Pat. No. 3,947,482).

The relative amounts of ingredients in the reaction mixture will be such that the mixture has a composition, in terms of mole ratios of oxides, within the following ranges:

| Oxide Constituents | General Ranges | Preferred Ranges |
| --- | --- | --- |
| SiO$_2$:Al$_2$O$_3$ | 4 to 30 | 4 to 15 |
| DO:Al$_2$O$_3$ | 0.02 to 4.0 | 0.02 to 2.0 |
| Na$_2$O:(Al$_2$O$_3$ + DO/2) | 1.4 to 6 | 1.8 to 4 |
| H$_2$O:(Al$_2$O$_3$ + DO/2) | 80 to 400 | 100 to 250 |
| R$_2$O:(Al$_2$O$_2$ + DO/2) | 0.02 to 3.0 | 0.02 to 1.0 |

Although the order of mixing the ingredients is not believed to be critical (except for the final addition of the acidic metal salt) in that the ingredients may be added simultaneously or sequentially, the preferred method is somewhat more involved.

The preferred method involves preparation of a sodium aluminate solution by dissolving the alumina source in a hot concentrated sodium hydroxide solution. Preferably, the temperature is between 70° C. and 100° C.

The transition metal source is dissolved in water, possibly acidified with an acid having an anion the same as the dissolved transition-metal source.

The cooled sodium aluminate solution is then mixed, preferably with vigorous stirring, with a sodium silicate solution. The seeds and templating agent are slowly added to the stirred mixture. The transition metal solution is slowly added to the resulting mixture, also with vigorous mixing.

The resulting reaction mixture is then placed in a reactor, ordinarily one which can withstand elevated pressures, e.g., a polytetrafluoroethylene-lined jar or an autoclave. The mixture is maintained at a temperature between about 70° C. and 250° C., preferably between about 90° C. and 180° C. Most preferably, the temperature is about 100° C. The exact temperature will, of course, depend upon the amount of sodium oxides present and the length of time available for reaction.

When the homogenized mixture is heated, it is maintained at the autogeneous pressures resulting from the temperature employed. The length of time required to produce the product crystals will depend mainly upon temperatures employed. At the most preferable temperature of 100° C., the time required for reaction is generally in the range of two to six days. Broadly, the heating will take place for as long as is desired or necessary to produce crystals of the desired product.

The product crystals may be recovered by, e.g., filtration or centrifugation, and are then washed to remove extra mother liquor. The washing should continue, with the wash water equilibrated with the product crystals, until the water has a pH between about 9 and about 12. The crystals may then be dried. Calcination, in an oxygen atmosphere, at a temperature between 400° C. and 600° C. is typically sufficient to remove the organic template. This is then followed by ion exchange into a suitable catalytic cation exchange form.

The composition of this invention may be used as a sorbent or a catalyst. In either of these applications, it may be desirable, or even necessary, to exchange the non-tetrahedral sites within the composition with cations from any of one or more members of Groups I through VIII of the Periodic Table or the rare earth metals, depending upon the intended end use. Preferably, the cations will be mono-, di-, or tri-valent metal cations, particularly from Groups I, II or III of the Periodic Table, such as barium, calcium, cesium, lithium, magnesium, sodium, potassium, strontium, zinc or the like. Hydrogen, rare earth metals, or ammonium ions may be used in certain instances. The ions may be exchanged before or after calcination of the composition to remove excess or included water. The presence of these exchangeable cations will not generally cause a substantial change in the structure of the transition-metal-aluminosilicate ECR-23-D catalyst compositions.

The exchanged ECR-23-D catalysts are fabricated into extrusions, pills, spheres, granules or other suitable catalyst form by mixing with an inert binder material followed by any of the known forming procedures well known in the art, such as extruding, pilling, etc. In such cases the binder will usually comprise between 2 and 40 wt % of an inorganic oxide; clays, such as kandites, smectites etc.; or graphite, long chain fatty acids and similar inert lubricants. In some cases, often with careful choice of the cation exchanged form, the catalyst may be self bound, that is prepared with no binder material, particularly in the case of pressure pilling or tableting. Additional catalytic metals of Group 8 of the Periodic Table may be exchanged or impregnated onto, or into, the catalyst either before or after this forming operation.

As noted above, the active compositions of this invention are substantially isostructural with the mazzite aluminosilicate zeolite except that an amount of transition metal is found in the tetrahedral framework positions.

The more desirable catalyst promoter, "as synthesized" composition has a chemical formula in the range:

$XR_2O: (a-x)Na_2O:yDO:Al_2O_3:3$ to $20SiO_2:0$ to $10$ $H_2O$ where $0.10<y>2.50$, $a=1$ to $1.5$, $x=0.01$ to $0.67$ and D is at least one divalent transition metal, preferably Ni or Co, or mixtures thereof and with Zn.

An even more preferable transition metal aluminosilicate is the composition with $0.20<y>1.50$.

In addition iron, gallium, and germanium may be substituted for aluminum and silicon.

R is one or a mixture of tetramethylammonium, bis-hydroxyethyl-dimethylammonium, tri-ethylenediamine, 1,4 diazobicyclo (2,2,2) octane, pyrrolidine or choline.

The typical X-ray powder diffraction pattern of ECR-23D is thus:

TABLE 1

| DÅ(±5%) | Rel. Int. |
|---|---|
| 9.13 | VS |
| 7.89 | M-S |
| 6.88 | M-S |
| 5.97 | S |
| 4.70 | M-S |
| 3.80 | VS |
| 3.71 | M |
| 3.62 | M |
| 3.52 | S-VS |
| 3.44 | W |
| 3.15 | S |
| 3.09 | W-M |
| 3.03 | W-M |
| 2.98 | W |
| 2.92 | S |
| 2.65 | W |
| 2.63 | W |

(VS = very strong; S = strong; M = medium; W = weak)

Based on these and other data, the average hexagonal unit cell size is about 18.26Å (±0.2) along the 'a' axis and about 7.65Å (±0.2) along the 'c' axis. The pore size is about 6Å. The inventive product is capable of adsorbing (after heating in air at high temperatures, e.g., 400° C., for dehydration and removal of template, if present) an amount of hexane equal to at least 3% by weight or water in at least 10% by weight.

EXAMPLES

The following examples illustrate the invention without limiting it in any way. In each of the examples, parts and percentages are given by weight and temperature is given in degrees Centigrade, unless otherwise noted.

Example 1

A seed composition was made by dissolving 12.02 gm aluminum oxide trihydrate in a solution of 60 gm NaOH in 100 gm $H_2O$ at 100° C. After complete dissolution of the alumina, the solution was cooled to room temperature and added, with vigorous mixing, to a dilute solution of sodium silicate (126.3 gm $H_2O$+201.6 gm 'N' Brand (P.Q. Corp.) sodium silicate). After homogenization, the solution was allowed to age prior to use as a nucleant slurry.

Example 2

Figure 1:
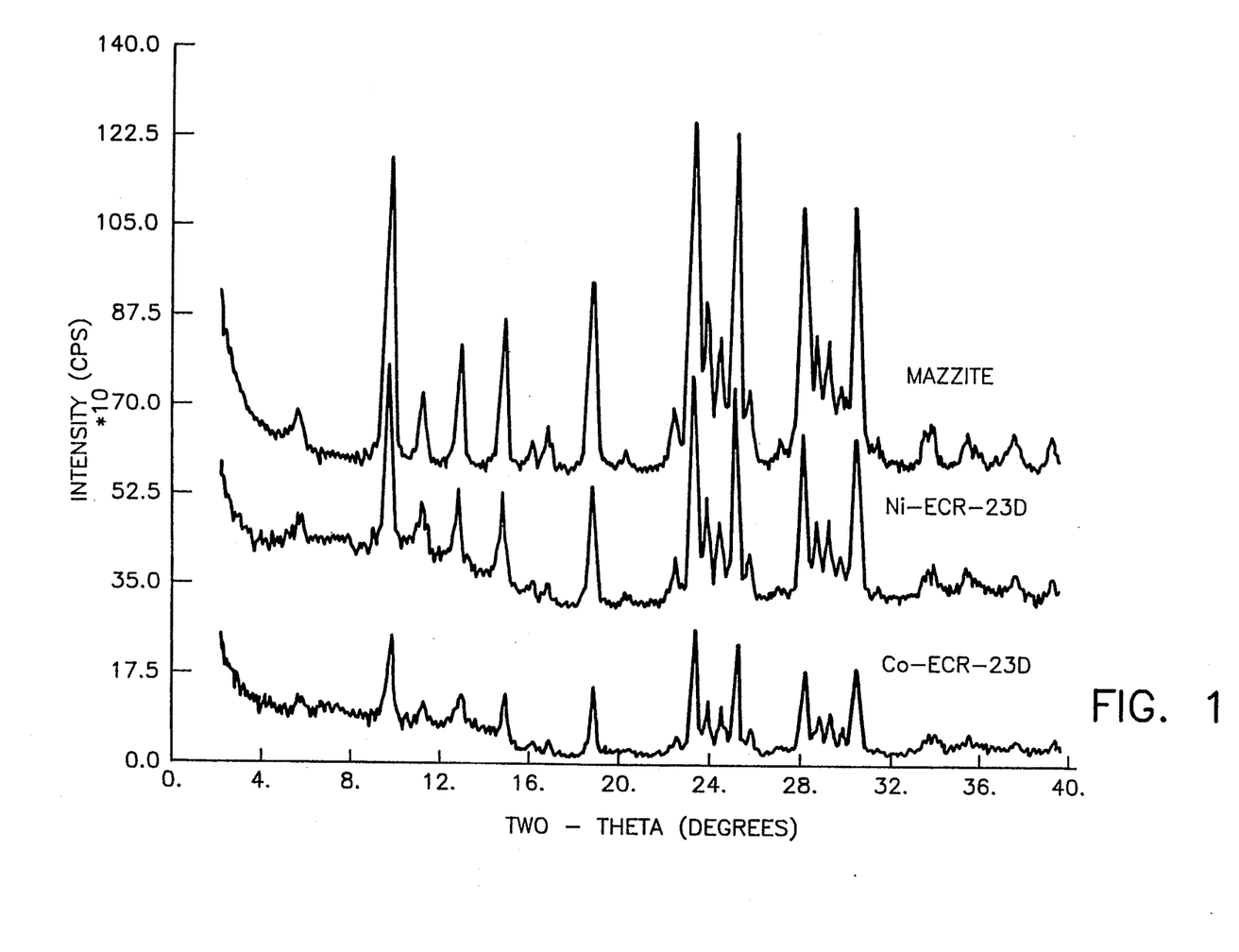
FIG. 1 compares the x-ray diffraction patterns of, respectively, a synthetic mazzite zeolite, and Ni and Co-ECR-23-D zeolites made according to the invention.

A gel composition of:

4.9 $Na_2O$:0.95$(TMA)_2O$:$Al_2O_3$:1.6 NiO:16$SiO_2$:238$H_2O$ was made by first making a sodium aluminate solution by dissolving 18.9 gm $Al_2O_3$•3$H_2O$ in a solution of 15 gms of NaOH in 25 gm $H_2O$ under reflux conditions. After complete dissolution of the alumina, the solution was cooled and diluted with water to a total weight of 79.5 gms. 4 gms of aluminum sulfate (17 $H_2O$) were dissolved in 6 gms $H_2O$. In a blender were added in sequence: 130.6 gms sodium silicate, 10.4 gms seeds from Example 1, 28.2 gms 25 wt % solution of TMAOH, 4.6 gms of sodium aluminate solution (as made above), 15.3 gms $NiCl_2$•6$H_2O$ dissolved in 15.5 gm $H_2O$, and 1.3 gm alum solution, and adjusted to a total weight of 250 gms. After thorough homogenization, the gel was placed in a capped Teflon jar and reacted at 100° C. for five days. The product was filtered, washed, dried and characterized. X-ray diffraction analysis showed the sample to be excellent ECR-23-D with an X-ray diffraction spectrum given in Table 2 and FIG. 1. Chemical analysis gave a composition:

5.89% Al; 24.2% Si; 4.7% Na; 8.82% Ni

Thermogravimetric analysis indicated a TMA content of 3 wt % from burnoff at 550° C., and a total $H_2O$ plus TMA weight loss of 19%. The ECR-23-D oxide stoichiometry is:

0.2$R_2O$:0.94 $Na_2O$:1.4NiO:$A_2O_3$:7.9 $SiC_2$ giving the product an unusual Si/Al ratio for this input stoichiometry. In terms of a zeolite stoichiometry compatible with this invention this can be calculated to be:

0.14$(TMA)_2O$:0.68$Na_2O$:0.46NiO:0.73$Al_2O_3$:0.55NiO:5.8$SiO_2$

Figure 2:
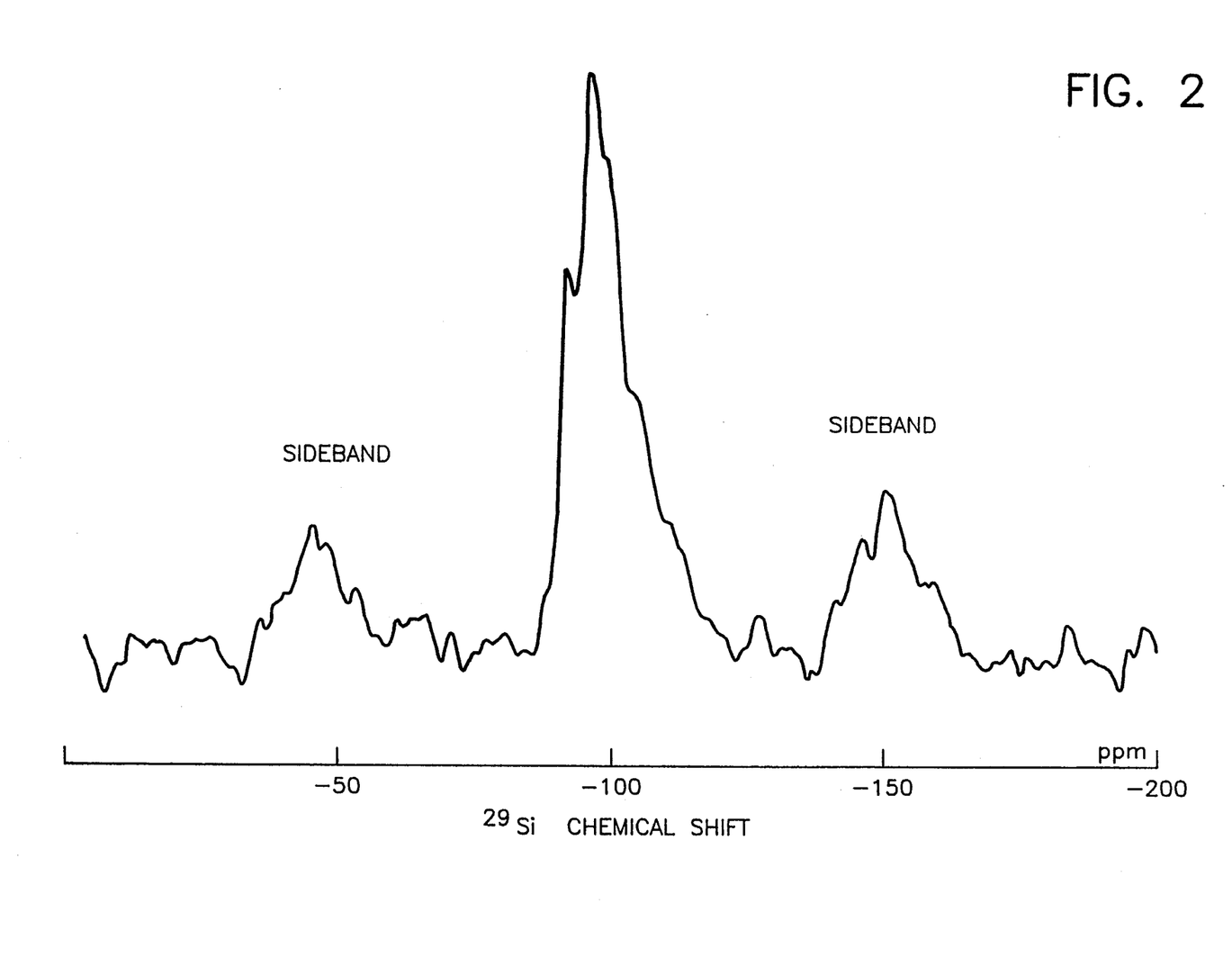
FIG. 2 is a 29 Si-MASNMR spectrum of Ni-ECR-23-D made according to the procedure of Example 2.
Figure 3:
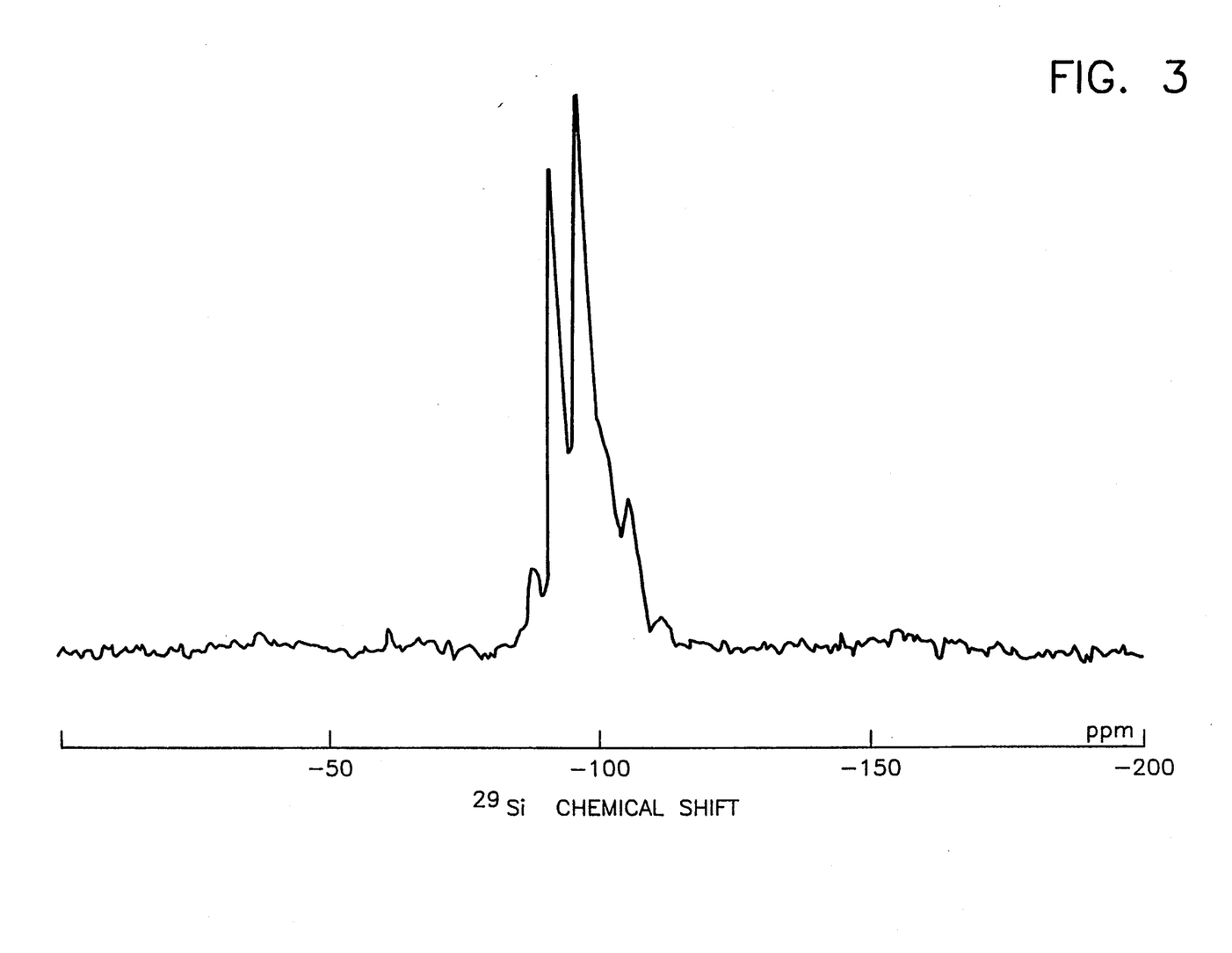
FIG. 3 is the 29 Si-MASNMR spectrum of a typical non-metallo-mazzite made according to the procedure of Example 4.
Figure 4:
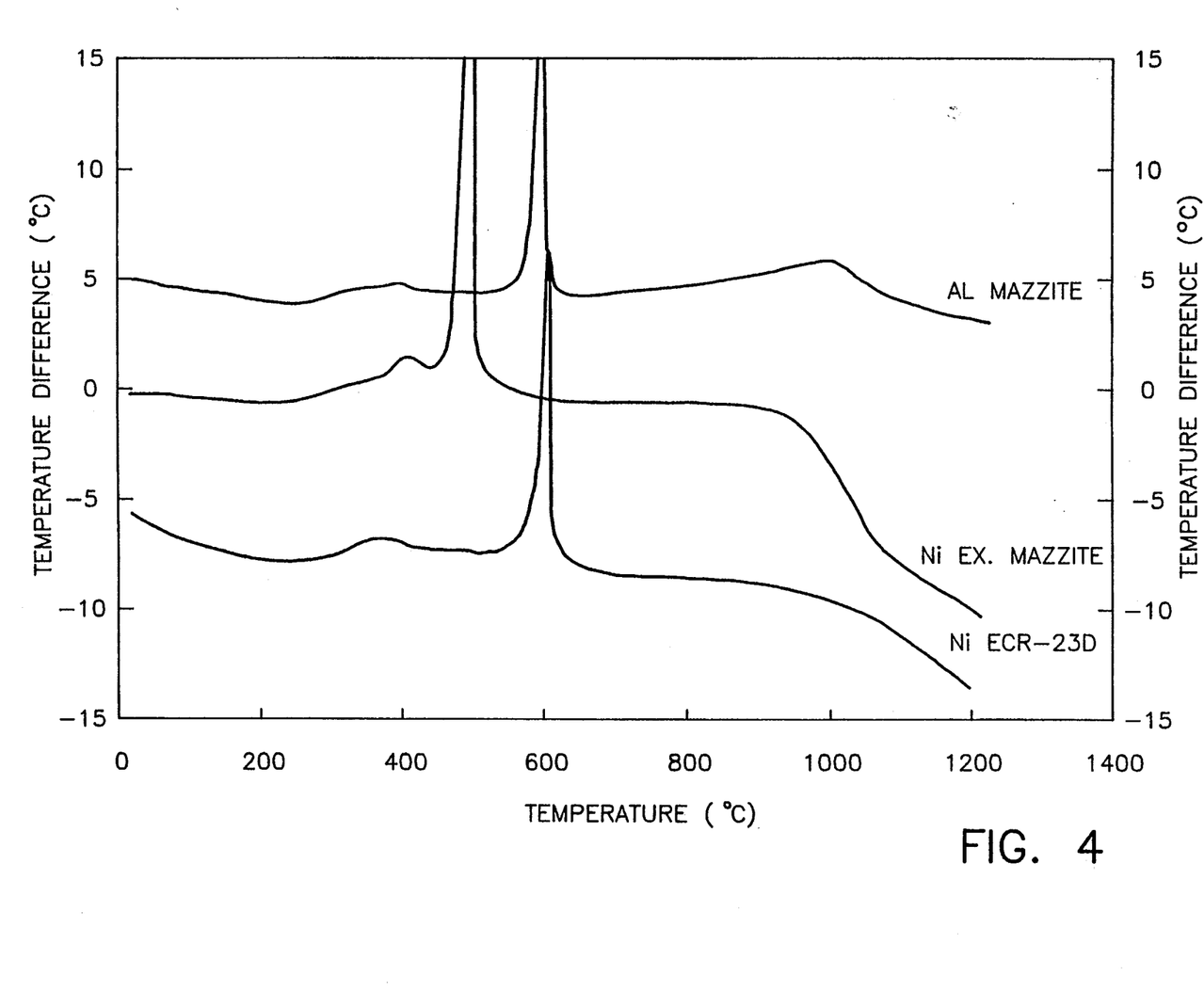
FIG. 4 is a comparison of the differential thermal analyses (DTA) of a Ni-ECR-23-D (Example 2), a typical mazzite (Example 4), and a $Ni^{2+}$ exchanged mazzite, the latter made according to the procedure of Example 5.

The hexagonal unit cell evaluation from the X-ray diffraction pattern gave a=18.20Å and c=7.64Å. The 29 Si-MASNMR spectrum of this material is shown in FIG. 2, and the center of mass of the spectrum indicates a Si/(Al,D) ratio approximating the zeolite stoichiometry rather than the oxide stoichiometry shown above. The complexity of the sideband structure in this spectrum indicates the strong influence of paramagnetic $Ni^{2+}$ neighbors on the Si, also reflected in the broadening of the main peaks. (The fact that mazzite has two T(Si) sites makes the spectral interpretation difficult because of overlapping peaks (Jarman et al, Phys. Chem., v. 88, p. 5748 (1984); Fyfe et al, Chem. Lett., p. 1547 (1983)). Note that the center of mass of this spectrum is similar to the same for Example 4 (FIG. 3). The DTA spectrum is shown in FIG. 4. EXAFS indicates oxygen coordination of five and a Ni-O bond distance of 2.05Å.

Example 3

A cobalt containing gel having a composition 4.9$Na_2O$:0.95$(TMA)_2O$:$Al_2O_3$:1.6CoO:16$SiO_2$:238-$H_2O$ was made in an identical manner to Example 2 except that 18.7 gms of $CoCl_2$•6$H_2O$ replaced the $NiCl_2$•6$H_2O$. After reacting for 72 hours at 100° C. the product was filtered, washed and dried. X-ray diffraction analysis showed the sample to comprise excellent ECR-23-D having the spectrum shown in Table 2 and FIG. 1. This was indexed on a hexagonal unit cell having dimensions a=18.22Å and c=7.63Å. Chemical analysis gave a composition of 6.07 Al; 25.0 Si; 4.46 Na; 9.68 Co. Thermogravimetric analysis indicated a TMA content of 4 wt %, and a maximum $H_2O$ content of 14 wt %. The chemical analysis indicates a oxide stoichiometry of:

0.25$(TMA)_2O$:0.86 $Na_2O$:1.46 CoO:$Al_2O_3$:7.92 $SiO_2$ or an equivalent zeolite stoichimetry of:

0.17$(TMA)_2O$:0.62$Na_2O$:0.5CoO:0.72 $Al_2O_3$:0.56CoO:5.72$SiO_2$ indicating that about 53% of the $Co^{2+}$ is in framework sites.

TABLE 2

| hkl | Standard AL Mazzite | | Example 2 | | Example 3 | |
|---|---|---|---|---|---|---|
| | dÅ | I/Io | dÅ | I/Io | dÅ | I/Io |
| 100 | 15.92 | 11 | 15.73 | 6 | 16.3 | 3 |
| 110 | 9.14 | 100 | 9.13 | 100 | 9.13 | 82 |
| 200 | 7.91 | 38 | 7.89 | 47 | 7.90 | 30 |
| 101 | 6.90 | 40 | 6.88 | 28 | 6.88 | 52 |
| 210 | 5.98 | 43 | 5.97 | 48 | 5.97 | 45 |
| 201 | 5.50 | 8 | 5.47 | 7 | 5.48 | 7 |
| 300 | 5.27 | 10 | 5.27 | 11 | 5.25 | 10 |
| 211 | 4.71 | 42 | 4.70 | 39 | 4.70 | 50 |
| 310 | 4.38 | 3 | 4.36 | 9 | 4.37 | 5 |
| 400 | 3.95 | 14 | — | — | 3.95 | 15 |
| 311 | 3.81 | 99 | 3.80 | 92 | 3.80 | 100 |
| 102 | 3.72 | 28 | 3.71 | 32 | 3.71 | 31 |
| 320 | 3.62 | 34 | 3.62 | 29 | 3.62 | 36 |
| 112 | 3.53 | 72 | 3.52 | 68 | 3.52 | 74 |
| 202 | 3.44 | 15 | 3.44 | 16 | 3.44 | 18 |
| 321 | 3.27 | 6 | 3.27 | 5 | — | — |
| 500 | 3.16 | 75 | 3.15 | 66 | 3.15 | 67 |
| 302 | 3.09 | 26 | 3.09 | 26 | 3.09 | 22 |
| 330 | 3.04 | 30 | 3.03 | 27 | 3.04 | 26 |
| 420 | 2.99 | 18 | 2.98 | 14 | 2.98 | 15 |
| 501 | 2.92 | 78 | 2.92 | 62 | 2.92 | 66 |
| 510 | 2.84 | 6 | 2.83 | 4 | 2.835 | 4 |
| 511 | 2.660 | 9 | 2.653 | 11 | 2.653 | 15 |
| 600 | 2.632 | 9 | 2.628 | 10 | 2.630 | 15 |
| 520 | 2.524 | 11 | 2.515 | 6 | 2.515 | 8 |
| 601 | 2.488 | 6 | 2.484 | 6 | — | — |
| 332 | 2.380 | 8 | 2.375 | 6 | 2.377 | 7 |
| 440 | 2.279 | 10 | 2.276 | 12 | 2.277 | 6 |
| 403 | 2.142 | 9 | 2.140 | 5 | 2.141 | 4 |
| 621 | 2.105 | 6 | — | — | — | — |

Example 4

A typical synthetic aluminosilicate mazzite was prepared as a standard comparison with the novel metallo-aluminosilicate compositions of this invention using a gel formulation of:

0.5(TMA)$_2$O: 2.75Na$_2$O: Al$_2$O$_3$: 9SiO$_2$: 140H$_2$O: 1.08Na$_2$SO$_4$ reacted at 150° C. for one day in a Teflon lined Parr autoclave. The product had a stoichiometry of 0.81 Na$_2$O: Al$_2$O$_3$: 5.66SiO$_2$ after burning out the TMA template at 550° C. for 3 hours.

To make a catalyst, 15 gm of this sample was exchanged with a solution of 15 gm ammonium chloride dissolved in 120 gm distilled water at 60° C. for one hour; filtered on a vacuum filter, washed with 150 ml 10% ammonium chloride solution on the filter followed by 300 ml distilled water. The sample was calcined for six hours at 320° C. in an air oven, and then given a second slurry ammonium chloride exchange in a like manner to the first exchange. This time the sample was air dried on the filter, then reslurried with 100 ml aqueous ammonia (29% NH$_3$) for 30 minutes, followed by filtration, washing on the filter with 100 ml distilled water, and drying at 110° C. in an air oven. 12 gm of this sample were exchanged to a Pt (metal) level of about 1% by contacting it with a solution of 0.212 gm Pt(NH$_3$)$_4$Cl2 dissolved in 41 ml aqueous ammonia for 20 minutes at room temperature; filtered on a vacuum filter, then air dried on the filter, followed by 1.5 hours in an air oven at 110° C. This sample was then formed into one inch tablets in a Carver Press and these were then crushed and sieved to a particle size range of 0.2 to 0.4 mm. The sample was then placed in a vacuum oven at 50° C., ramped to 250° C. in one hour, and held at 250° C. for one hour, at which time the temperature was reduced to 150° C. 4 gm of this catalyst was weighed into a dish and placed in a desiccator containing 3A (i.e., K-LTA) molecular sieves.

This 4 gm catalyst sample was then loaded into a 0.5 inch diameter stainless steel reactor, and topped to 12 cm bed depth with 0.1 to 0.2 mm diameter glass beads. Reactor start-up procedures ramped the temperature to 454° C. at a rate of 3° C./minute under a hydrogen flow rate of 100 ml/minute. STP (10 barG pressure), and held the reactor at this temperature for 15 minutes before reducing the temperature to the operational temperature. At this time the n-hexane feed was introduced into the hydrogen stream to give an n-hexane equivalent space velocity (WHSV) of 2, a H$_2$/n-hexane of 2.5, and a pressure of 10 barG. Samples were recovered and analyzed on line by gas chromatography at appropriate times. These results are given in Table 3 and show that the catalyst must be run at a temperature of over 360° C. to maintain a conversion level of 50%.

Example 5

The material of the present invention was compared to a nickel exchanged aluminosilicate by exchanging 2.0 grains of the as synthesized aluminosilicate mazzite of Example 4 with 2.0 g of Ni(NO$_3$)$_2$•6H$_2$O in 40 mls of aq. NH$_4$OH(29% NH$_3$) at room temperature with stirring for 1 hour. The sample was filtered and then washed with aq. NH$_4$OH and H$_2$O. The sample was then subjected to a second Ni$^{2+}$ exchange as above and then dried in a 115° C. oven. The NiECR-23D product of Example 2, the aluminosilicate product of Example 4, along with the Ni$^{2+}$ exchanged product of this example were analyzed by differential thermal analysis (DTA) as shown in FIG. 3. The large exothermic reactions in these DTAs show the loss of template from the products. The 120° C. lower degradation temperature of TMA Ni$^2$ exchanged material clearly shows that it is catalyzing the loss of tetramethyammonium cation indicating that it is in an accessible site as compared to the ECR-23D material of the present invention in which the TMA degrades at about the same temperature as in the non-Ni aluminosilicate form. Therefore the location of nickel in the material of the present invention is clearly not located in the same site as nickel in an exchanged aluminosilicate mazzite, confirming that it is in a "locked in" site commensurate with a framework site.

Example 6

A reaction mixture having the following oxide ratios:

.5 TMA$_2$O: 2.75 Na$_2$O: .5 NiO, Al$_2$O$_3$: 9 SiO$_2$: 140 H$_2$O was made by first making a sodium aluminate solution by dissolving 75 g aluminum oxide trihydrate in a solution containing 59 g NaOH and 100 ml H$_2$O. After cooling down, the solution was diluted to 250 g with distilled H$_2$O. In a beaker were mixed 257.4 g of sodium silicate (P.Q. Corp., N brand, 28.7% SiO$_2$; 8.9% Na$_2$O), 18.2 g of a "seed" solution (13.33 Na$_2$O: Al$_2$O$_3$: 12.5 SiO$_2$: 267 H$_2$O, see U.S. Pat. Nos. 3,574,538 and 4,340,573), and 45.3 g of sodium aluminate solution. Swirled in 51.2 g of 25% aq. TMAOH, 30.1 g of Al$_2$(SO$_4$)$_3$•17H$_2$O in 30.1 g H$_2$O, and 20.4 g Ni(NO$_3$)$_2$•6H$_2$O in 25 mls H$_2$O. The total weight of the mixture was adjusted to 500 g by addition of H$_2$O, and then thoroughly homogenized in a blender. The mixture was then placed in four 125 ml teflon lined autoclaves and reacted at 125° C. for 22 hours after cold aging for one day. The product was filtered, washed with distilled H$_2$O, and dried in a 115° C. oven. X-ray powder diffraction analysis showed the crystalline phase to be excellent ECR-23D. Elemental analysis by ICP-AES and AA gave 5.86% Na; 23.7% Si; 7.28% Al; 5.55% Ni.

15 gm of this calcined, template free, ECR-23D nickel aluminosilicate product was exchanged with a solution of 15 gm ammonium chloride dissolved in 120 gm distilled water at 60° C. for one hour; filtered on a vacuum filter, washed with 150 ml 10% ammonium chloride solution on the filter followed by 300 ml distilled water. The sample was calcined for six hours at 320° C. in an air oven, and then given a second slurry ammonium chloride exchange in a like manner to the first exchange. The sample was air dried on the filter, then reslurried with 100 ml aqueous ammonia (29% NH$_3$) for 30 minutes, followed by filtration, washing on the filter with 100 ml distilled water, and drying at 110° C. in an air oven. This sample was formed into one inch tablets in a Carver Press and these were then crushed and sieved to a particle size range of 0.2 to 0.4 mm. The sample was then placed in a vacuum oven at 50° C., ramped to 250° C. in one hour, and held at 250° C. for one hour, at which time the temperature was reduced to 150° C. 4 gm of this catalyst was weighed into a dish and placed in a desiccator containing 3A (i.e., K-LTA) molecular sieves. (Note that this catalyst does not contain platinum.) Catalytic results for this catalyst, obtained in a similar manner to those for Example 4, are compared with the same for Example 4 in Table 3. Although this is a non-noble metal catalyst, it shows a high activity, with a stronger selectivity for cracking.

Example 7

15 gm of the nickel aluminosilicate ECR-23D product of Example 5 was converted into a Pt co-promoted catalyst by first exchanging with a solution of 15 gm ammonium chloride dissolved in 120 gm distilled water at 60° C. for one hour; filtered on a vacuum filter, washed with 150 ml 10% ammonium chloride solution ity transition metals in the zeolite framework is a novel approach to sulfur resistant catalyst formulations.

Having thus described the invention and provided examples showing the synthesis and the product, it should be apparent to those having ordinary skill in this art that obvious variations of the process of making the composition would be within the scope of this invention as described below.

TABLE 3

| Catalyst | Example 4 | Example 4 | Example 4 | Example 5 | Example 5 | Example 6 | Example 6 | Example 6 | Example 6 |
|---|---|---|---|---|---|---|---|---|---|
| Temp. C. | 310 | 360 | 380 | 360 | 380 | 310 | 340 | 360 | 380 |
| Time on oil | 10 hr. | 12 hr | 17 hr | 4 hr | 8 hr | 5 hr | 16 hr | 18 hr | 14 hr |
| Conversion | 6.8 | 48.6 | 72.64 | 42.21 | 46.57 | 24.91 | 55.84 | 77.21 | 83.79 |
| C1 | 0.13 | 0.47 | 0.45 | 2.48 | 4.78 | 3.11 | 0.76 | 2.54 | 4.9 |
| C2 | 0.19 | 0.64 | 0.59 | 0.67 | 1.28 | 0.4 | 0.12 | 0.42 | 0.97 |
| C3 | 0.69 | 2.41 | 3.71 | 5.5 | 9.38 | 0.99 | 1.07 | 4.5 | 11.36 |
| i-C4 | 0.02 | 0.27 | 0.66 | 2.45 | 4.29 | 0.06 | 0.3 | 1.44 | 3.12 |
| n-C4 | 0.35 | 1.04 | 0.99 | 2.8 | 3.59 | 1.77 | 0.48 | 1.66 | 3.13 |
| i-C5 | 0.03 | 0.45 | 0.97 | 3.92 | 3.67 | 0.64 | 0.65 | 2.86 | 5.1 |
| n-C5 | 0.41 | 0.93 | 0.76 | 3.71 | 3.09 | 8.67 | 1.15 | 2.54 | 3.44 |
| 2,2-DMB | 0.04 | 3.23 | 9.21 | 0.77 | 0.63 | 0.19 | 3.77 | 8.29 | 7.38 |
| 2,3-DMB | 0.15 | 2.24 | 5.51 | 2.39 | 2 | 0.27 | 4.42 | 5.87 | 5.31 |
| 2-MeC5 | 2.6 | 21.38 | 28.49 | 10.21 | 8.17 | 4.97 | 25.36 | 27.59 | 22.49 |
| 3-MeC5 | 2.05 | 15.06 | 20.23 | 6.96 | 5.45 | 3.74 | 17.63 | 19.16 | 16.01 |
| n-C6(feed) | 93.2 | 51.4 | 27.36 | 57.74 | 53.43 | 75.09 | 44.16 | 22.79 | 16.21 |
| Mecyclo-C5 | 0.14 | 0.36 | 0.63 | 0.11 | 0.08 | 0.08 | 0.13 | 0.18 | 0.22 |
| Benzene | 0 | 0.07 | 0.28 | 0.14 | 0.1 | 0 | 0 | 0.03 | 0.18 |
| cyclo-C6 | 0 | 0.07 | 0.08 | 0 | 0 | 0.03 | 0 | 0 | 0.03 | on the filter followed by 300 ml distilled water. The sample was calcined for six hours at 320° C. in an air oven, and then given a second slurry ammonium chloride exchange in a like manner to the first exchange. This time the sample was air dried on the filter, then reslurried with 100 ml aqueous ammonia (29% $NH_3$) for 30 minutes, followed by filtration, washing on the filter with 100 ml distilled water, and drying at 110° C. in an air oven. 8.6 gm of this sample were exchanged to a Pt (metal) level of about 1% by contacting it with a solution of 0.152 gm $Pt(NH_3)_4Cl_2$ dissolved in 30 ml aqueous ammonia for 20 minutes at room temperature; filtered on a vacuum filter, then air dried on the filter, followed by 1.5 hours in an air oven at 110° C. This sample was then formed into one inch tablets in a Carver Press and these were then crushed and sieved to a particle size range of 0.2 to 0.4 mm. The sample was then placed in a vacuum oven at 50° C., ramped to 250° C. in one hour, and held at 250° C. for hone hour, at which time the temperature was reduced to 150° C. 4 gm of this catalyst was weighed into a dish and placed in a desiccator containing 3A (i.e., K-LTA) molecular sieves.

This catalyst was evaluated using the identical procedure to that used for Examples 4 and 5, with which it is compared in Table 3. The co-promoted catalyst of this example is clearly superior to those of Examples 4 and 5 in activity and selectivity for iso-$C_6$ products. Activities of 50% are attained at less than 340° C. (about a 25° C. advantage over the non-nickel zeolite) and this catalyst has the additional advantage of the nickel protection of the noble metal in the presence of sulfur poisons. After 18 hours on stream the catalyst showed no signs of aging, indicated by constant, reproducible and steady yield patterns at several temperatures.

These results show that the unique divalent framework substituted metallo aluminosilicates of this invention, together with their noble metal co-promoted variants, are improved over the original hydrocarbon conversion catalysts. The incorporation of high sulfur affinity transition metals in the zeolite framework is a novel approach to sulfur resistant catalyst formulations.

What is claimed is:

1. A crystalline microporous transition-metal-aluminosilicate catalyst which is isostructural to a mazzite zeolite and wherein a Ni, Co, Zn or mixtures thereof portion of is in the tetrahedral position of the transition-metal-aluminosilicate.

2. The transition-metal-aluminosilicate catalyst of claim 1 having the following chemical composition:

0.8 to 1.5 (R, $Na)_2O$: yDO: $Al_2O_3$: 3 to 20 $SiO_2$: 0 to 12 $H_2O$ where $0.05 < y < 2.50$, D is at least one of Ni, Co, or Zn and mixtures thereof, and R is one or more of tetramethyl ammonium, bisdihydroxyethyl-dimethyl ammonium, triethylene diamine, 1,4 diazobicyclo (2,2,2) octane, pyrrolidine, or choline.

3. The transition-metal-aluminosilicate catalyst of claim 2 wherein D is Ni.

4. The transition-metal-aluminosilicate catalyst of claim 2 wherein D is Co.

5. The transition-metal-aluminosilicate catalyst of claim 2 wherein D is a mixture of Co and Zn.

6. The transition-metal-aluminosilicate catalyst of claim 2 wherein D is a mixture of Ni and Co.

7. The transition-metal-aluminosilicate catalyst of claim 2 wherein D is a mixture of Ni and Zn.

8. The transition-metal-aluminosilicate catalyst of claim 2 wherein D is a mixture of Ni, Co and Zn.

9. The transition-metal-aluminosilicate of claim 1 which has been at least partially ion exchanged with a cation from any one or more of Groups I through VIII of the Periodic Table, the rare earth metals, or an ammonium cation.

10. The transition-metal-aluminosilicate of claim 9 which has been exchanged with one or more metal cations selected from barium, calcium, cesium, lithium, magnesium, sodium, potassium, strontium or zinc.

11. A process for producing a microporous transition-metal-aluminosilicate catalyst isostructural to a mazzite zeolite and a portion of Ni, Co and Zn and mixtures thereof within the tetrahedral framework of the transition-metal-aluminosilicate, comprising the steps of:
  preparing a reaction mixture comprising an alumina source, a silica source, a divalent transition metal source, a sodium oxide source, an organic template, and a seed source with substantial mixing,
  maintaining the reaction mixture at a temperature and for a time sufficient to crystallize said transition-metal-aluminosilicate,
  recovering said transition-metal-aluminosilicate catalyst, and calcining said catalyst to remove the trapped template ions.

12. The process of claim 11 wherein the reaction mixture has a composition, in terms of mole ratios of oxides, within the following ranges:

| | |
|---|---|
| $SiO_2:Al_2O_3$ | 4 to 30 |
| $[DO]:Al_2O_3$ | 0.02 to 4.0 |
| $Na_2O:(Al_2O_3 + [DO/2])$ | 1.4 to 6 |
| $H_2O:(Al_2O_3 + [DO/2])$ | 80 to 400 |
| $R_2O:(Al_2O_3 + [DO_2])$ | 0.02 to 3.0 | where D is at least one of Ni, Co, Zn, or mixtures thereof.

13. The process of claim 12 wherein the reaction mixture has a composition, in terms of mole ratios of oxides, within the following ranges:

| | |
|---|---|
| $SiO_2:Al_2O_3$ | 4 to 15 |
| $[DO]:Al_2O_3$ | 0.02 to 4.0 |
| $Na_2O:(Al_2O_3 + [DO/2])$ | 1.8 to 4 |
| $H_2O:(Al_2O_3 + [DO/2])$ | 100 to 250 |
| $R_2O:(Al_2O_3 + [DO/2])$ | 0.02 to 1.0 |

14. The process of claim 12 wherein D is Ni.
15. The process of claim 12 wherein D is Co.
16. The process of claim 12 wherein D is a mixture of Co and Zn.
17. The process of claim 12 wherein D is a mixture of Ni and Co.
18. The process of claim 12 wherein D is a mixture of Ni and Zn.
19. The process of claim 12 wherein D is a mixture of Ni, Co, and Zn.
20. The process of claim 11 wherein the transition metal silicate is post-treated with a solution of a noble metal of Group 8 of the Periodic Table so as to deposit between 0.1 and 3.0 wt % of said metal within the catalyst.
21. The process of claim 20 wherein the metal is Pt or Pd or a mixture of the two.

* * * * *